(12) United States Patent
Downey et al.

(10) Patent No.: US 10,046,905 B2
(45) Date of Patent: Aug. 14, 2018

(54) INTERMODAL CONTAINER TANK STRUCTURE

(71) Applicant: newterra ltd., Brockville (CA)

(72) Inventors: Jason Downey, Ottawa (CA); Benjamin Wilson, Elizabethtown (CA); Jeffrey Kempson, Brockville (CA)

(73) Assignee: Newterra Ltd., Brockville, Ontario (CA)

( * ) Notice: Subject to any disclaimer, the term of this patent is extended or adjusted under 35 U.S.C. 154(b) by 249 days.

(21) Appl. No.: 15/136,896

(22) Filed: Apr. 23, 2016

(65) Prior Publication Data

US 2016/0318706 A1 Nov. 3, 2016

Related U.S. Application Data (60) Provisional application No. 62/153,595, filed on Apr. 28, 2015.

(51) Int. Cl.
| | |
|---|---|
| *C02F 3/02* | (2006.01) |
| *B65D 88/02* | (2006.01) |
| *B01D 21/00* | (2006.01) |
| *B65D 90/04* | (2006.01) |
| *B65D 90/08* | (2006.01) |
| *C02F 3/12* | (2006.01) |

(52) U.S. Cl.
CPC ....... *B65D 88/022* (2013.01); *B01D 21/0003* (2013.01); *B65D 90/04* (2013.01); *B65D 90/08* (2013.01); *C02F 3/1236* (2013.01); *C02F 3/1268* (2013.01); *C02F 2201/007* (2013.01); *C02F 2203/006* (2013.01); *Y02W 10/15* (2015.05)

(58) Field of Classification Search
CPC ...... B65D 88/022; B65D 90/04; B65D 90/08; B01D 21/0003
USPC ....................................................... 210/620
See application file for complete search history.

(56) References Cited

U.S. PATENT DOCUMENTS

| | | | | |
|---|---|---|---|---|
| 6,977,038 B2 * | 12/2005 | Jowett | ....................... | C02F 3/04 210/220 |
| 2012/0055859 A1 * | 3/2012 | Reilly | ................ | B01D 21/0093 210/141 |

* cited by examiner

*Primary Examiner* — Claire A Norris
(74) *Attorney, Agent, or Firm* — Stuart L. Wilkinson (57) ABSTRACT

A water treatment tank is constructed from several adjoining intermodal containers (ICs). The adjoining ICs are angularly disposed relative to each other so as to surround a tank area. Each IC has a reinforced sidewall defining a tank wall or tank wall part. A bracing structure is attached to ICs end walls at each junction between adjoining ICs. The tank having a liner supported at the sidewalls and covering the ground at the tank area.

18 Claims, 12 Drawing Sheets

INTERMODAL CONTAINER TANK STRUCTURE

CROSS REFERENCE TO RELATED PATENTS

The present U.S. Utility Patent Application claims priority pursuant to 35 U.S.C. 119(e) to U.S. Provisional Patent Application Ser. No. 62/153,595, entitled "INTERMODAL CONTAINER TANK STRUCTURE" filed Apr. 28, 2015.

FIELD OF THE INVENTION

This invention relates to water treatment tanks constructed using intermodal containers (ICs) and to methods for making such tanks.

DESCRIPTION OF RELATED ART

Water tanks are needed for a variety of purposes in the context of wastewater treatment. Holding tanks are used for storing water before or after it is treated. Equalization tanks are used in processes for dampening large variations in water flow rate or quality. Aeration tanks are used for stimulating aerobic breakdown of contaminants in wastewater. Membrane bioreactor (MBR) tanks are used to remove contaminants during or after aeration. Settling tanks are used to remove heavier-than-water solids. Filtration tanks are used for filtering wastewater. Air/water tanks, in which countercurrents of air and water are flow over packing material, are used for air stripping of volatile contaminants or for cooling and evaporation.

There is a requirement for easily portable tank structures that can be partly pre-fabricated and shipped to deployment sites for installation. The requirement for transporting in conventional intermodal container sizes places limitations on the length, footprint area and height of prefabricated mobile units. It has been proposed that an IC itself might be used in the manufacture of a water treatment tank. A typical IC (also called shipping container, freight container, ISO container, hi-cube container, box, conex box and sea can) is a standardized reusable steel box used for the storage and movement of materials and products within a global containerized intermodal freight transport system. External lengths of containers, which each have a unique ISO 6346 reporting mark, vary from 8 feet (2.438 m) to 56 feet (17.07 m) with the most common lengths being 20 feet and 40 feet. Heights of containers compliant with ISO 6346 are from 8 feet (2.438 m) to 9 feet 6 inches (2.9 m). Widths are generally 8 feet. Improvements in the manner in which ICs may be used for water treatment are possible.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
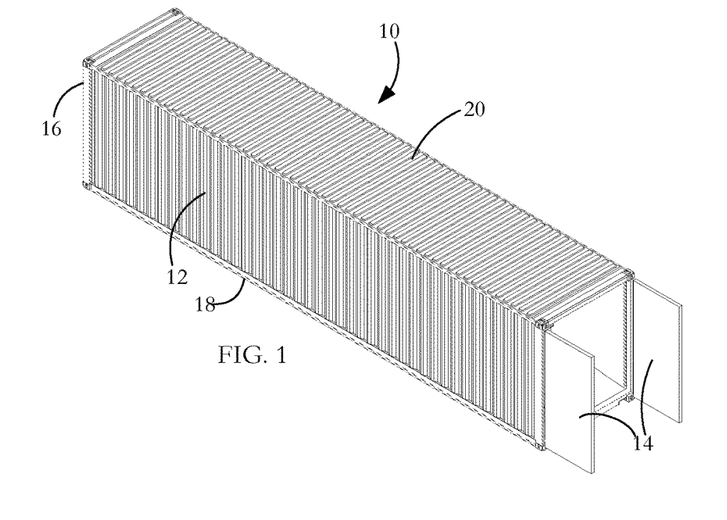
FIG. 1 is an isometric view of an ISO standard compliant intermodal container (IC).
Figure 2:
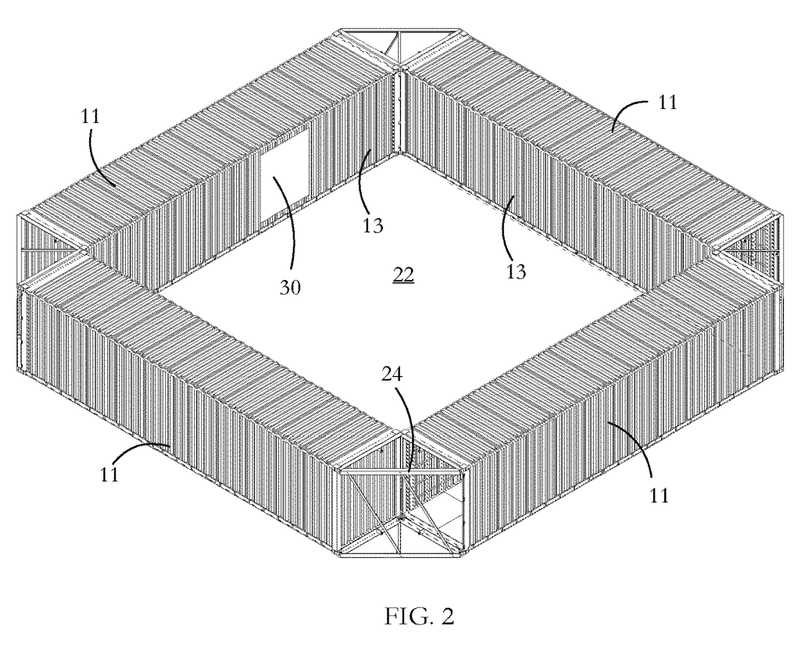
FIG. 2 is an isometric view of an array of four ICs arranged to form part of a tank according to an embodiment of the invention.
Figure 3:
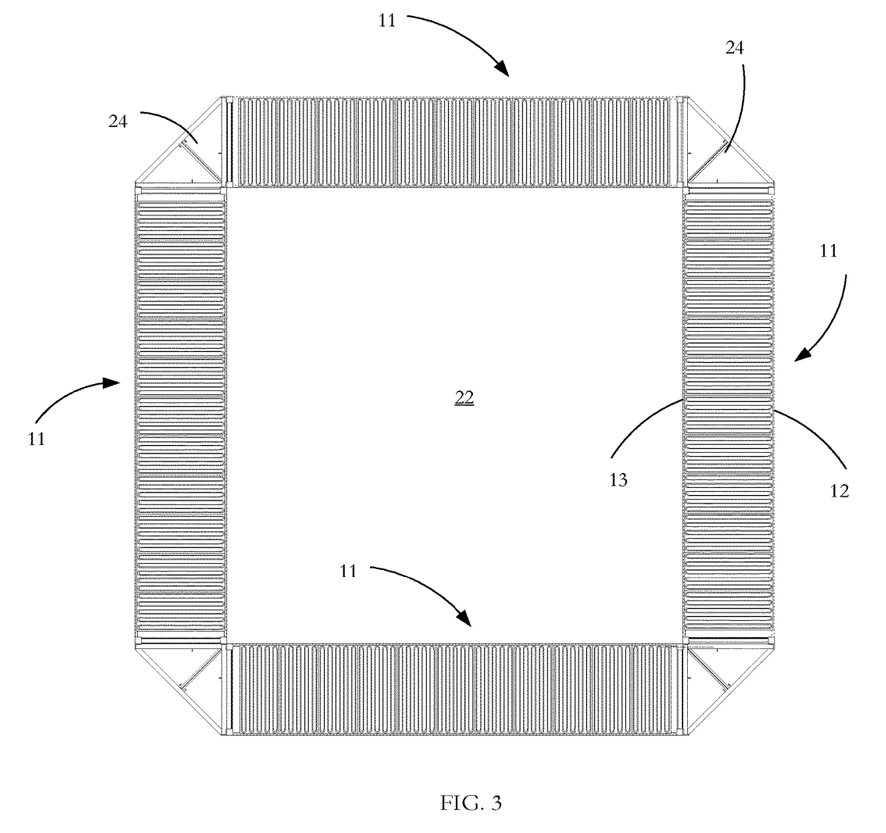
FIG. 3 is a plan view of the array of FIG. 2.
Figure 4:
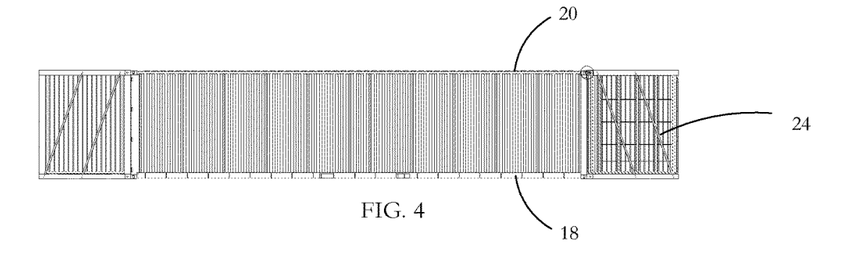
FIG. 4 is a side view of the array of FIG. 2.
Figure 5:
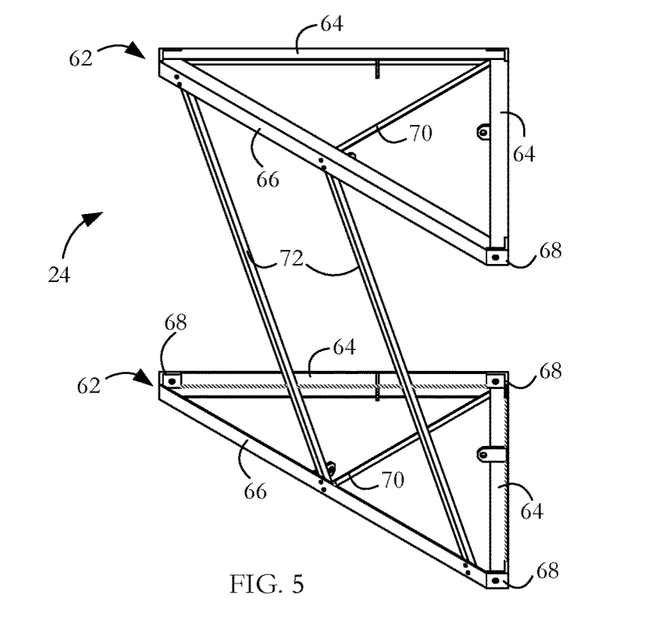
FIG. 5 is an isometric view of a bracing structure forming part of a tank structure according to an embodiment of the invention.
Figure 6:
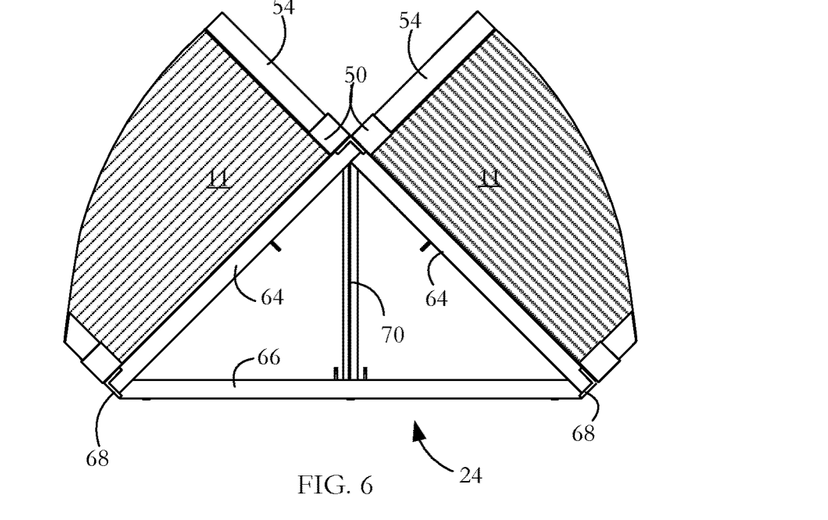
FIG. 6 is a plan view of the bracing structure of FIG. 5 joining two ICs forming parts of a tank structure according to an embodiment of the invention.
Figure 20:
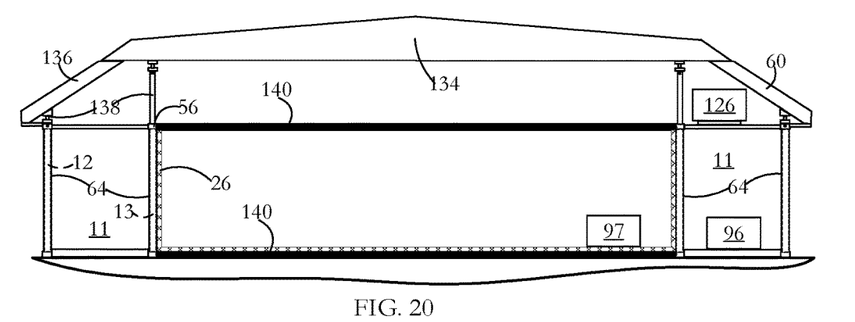
FIG. 20 is a sectional view showing a tank structure according to an embodiment of the invention having one form of roof arrangement.
Figure 21:
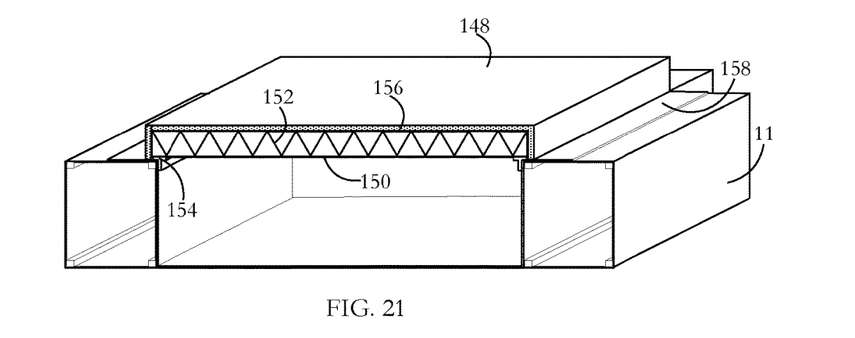
FIG. 21 is a sectional isometric view showing a tank structure according to an embodiment of the invention having another form of roof arrangement.
Figure 22:
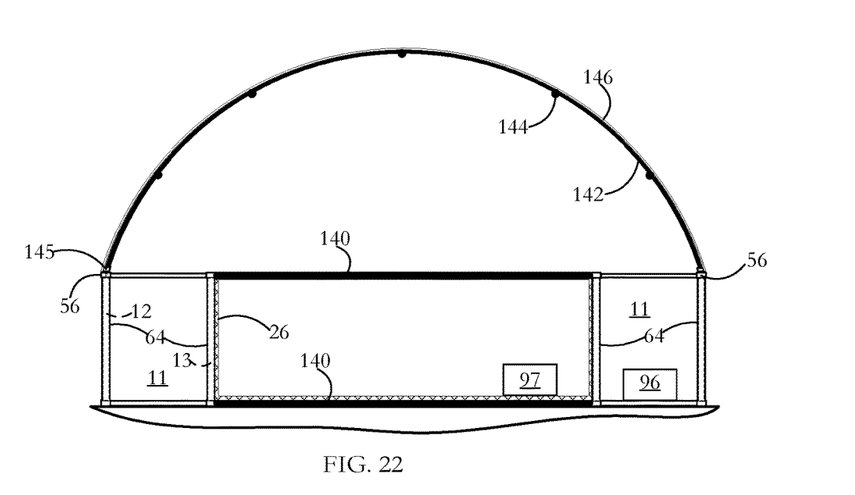
FIG. 22 is a sectional view showing a tank structure according to an embodiment of the invention having a further form of roof arrangement.

Referring in detail to FIG. 1, there is shown a conventional intermodal container (IC) 10. The IC is basically a box made from weathering sheet steel having sidewalls 12, front doors 14, a rear wall 16, a floor 18 and a roof 20. Such ICs are also known as shipping or freight containers and are conventionally used for the storage and movement of materials and products within a global containerized intermodal freight transport system. "Intermodal" indicates that the IC can be moved from one mode of transport to another (e.g. from ship, to rail, to truck) without unloading and reloading the contents of the IC. Under international standard ISO 6346, the length of an IC may be any of a range of external lengths each corresponding to an ISO 6346 reporting mark. Such lengths may vary from 8 feet (2.438 m) to 56 feet (17.07 m) with the most common lengths being 20 feet and 40 feet. Heights of containers compliant with ISO 6346 are from 8 feet (2.438 m) to 9 feet 6 inches (2.9 m). Widths are generally 8 feet FIGS. 2-4 show a group of four modified intermodal containers (ICs) 11 arranged in a square formation around a central space 22, each modified IC being essentially a thick tank wall. The ICs are reinforced and are bolted together at adjacent corners, the union between each adjacent pair of ICs being strengthened by brace structures 24 as shown in FIGS. 5 and 6. As shown in FIGS. 20-22, the interior ground space 22 bounded by the ICs and the reinforced sidewalls 13 of the ICs facing into the interior ground space are, in use, covered by a waterproof liner 26 whereby the assembly can be used as a water-containing tank, one embodiment of liner 26 being shown in FIGS. 7 and 8. For some water treatment purposes, such as use as an MBR reactor tank, the tank may be covered by a roof, while for other water treatment purposes, such as uses as an equalization tank, the tank may be left open. As shown in FIG. 20, for treatment of wastewater contained in the tank, some water processing equipment and support equipment such as power units are mounted within selected ones of the ICs. At certain positions in IC sidewalls forming the walls of the tank are located ports for mounting pipes, electrical and communication cables, sensors, monitors, probes, etc., for use in monitoring the condition of water contained in the tank and for treating the water to change that condition. While these ports can be distributed over a particular IC sidewall, in a preferred arrangement as shown in FIGS. 9-12, they are installed in a special purpose process wall 28 which is installed in a large opening made in one or more of the interior-facing IC sidewalls 13. As shown in FIG. 20, there may also be water processing units 97, such as membrane modules, mounted inside the tank. In use, water such as wastewater is pumped into the tank and stored or treated. Subsequently, the water, whether remediated or not, is pumped out of the tank for further processing, use, storage, or disposal.

The permitted variations in length and height of conventional ISO standard-compliant ICs allow for a corresponding variation in tank sidewall length and tank height that can be implemented with the illustrated arrangement. In addition, if non-square, rectilinear tanks or polygonal tanks of non-rectilinear plan form are desired, block tanks using the IC wall principle embodied in FIGS. 2-4 can be used to achieve such alternative plan forms.

To resist high pressure applied at the IC sidewalls when the tank is filled with water to be treated or stored, the individual ICs 11 and their interconnections to each other are reinforced. Exemplary arrangements for strengthening an IC sidewall are described in co-pending U.S. patent application Ser. No. 14/176,122, Method of reinforcing an intermodal container and container so reinforced, filed Feb. 9, 2014, which is hereby incorporated by reference in its entirety. An IC sidewall can be reinforced in any number of ways such as, for example, welding structural steel beams at appropriate locations over the area of the wall. The reinforcing may be applied to the interior, exterior, or both the interior and exterior of the IC sidewall. In all such reinforcing arrangements, an important criterion is that the reinforcing should strengthen the wall sufficiently that it will easily withstand an operating load when the tank is full of water; i.e. to a depth of 8 or 9 feet. Because the water pressure increases towards the bottom of the tank when the tank is full, reinforcing can be such that the wall is more strongly reinforced near the bottom of the IC sidewall than near the top.

Figure 13:
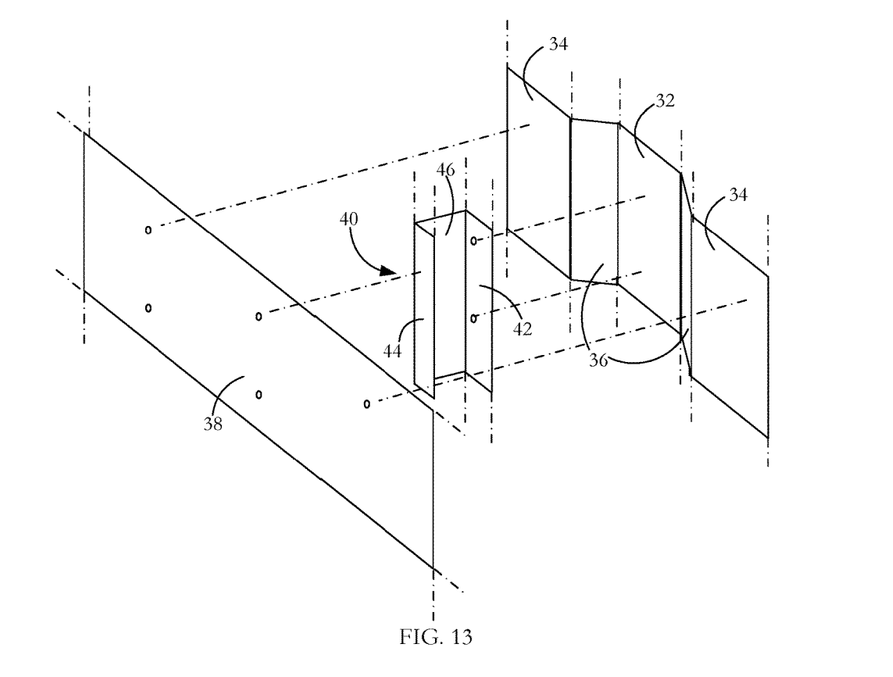
FIG. 13 is an exploded detail view illustrating a reinforcing structure for reinforcing the sidewall of an IC for use in a tank structure according to an embodiment of the invention.
Figure 14:
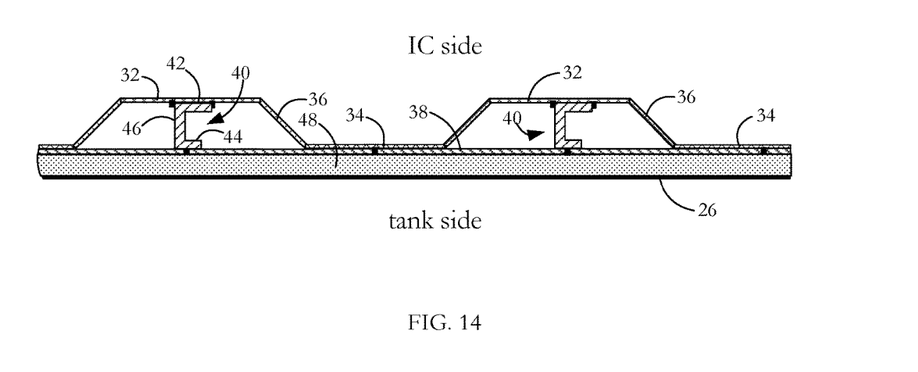
FIG. 14 is a sectional view illustrating a reinforcing structure for reinforcing the sidewall of an IC for use in a tank structure according to an embodiment of the invention.

A secondary criterion is that the IC sidewall bounding the tank should be relatively flat. A flexible liner of the type envisaged and described with respect to FIGS. 7 and 8 will deform to adapt it to the corrugations that typically characterize an IC sidewall. Furthermore, an optional insulation layer, if installed between the liner and the IC sidewall, can also be made deformable or can be shaped to adapt it to the corrugated IC sidewall surface. However, it is preferred that a substantially flat tank surface is obtained as a side result of reinforcing the IC sidewalls. The sidewalls of an unmodified IC are made of corrugated painted weathering sheet steel having a thickness of the order of a sixteenth of an inch. As shown in the detail views of FIGS. 13 and 14, corrugated walls have, in sequence along their length, alternating inboard and outboard panels, respectively 32 and 34, each outboard panel 34 integrally joined to its adjacent inboard panels 32 by sloping web portions 36. The panels 32, 34 and the web portions 36 extend from the bottom to the top of the IC. While the corrugated wall formation provides some strength against lateral and vertical forces, when the tank is filled, high water pressure is experienced at the IC sidewalls and the corrugations, without reinforcement, would simply expand like an accordion. The IC sidewall would then be incapable of offering resistance to the lateral forces imposed by the water and would consequently bow outwardly from the tank interior and would eventually burst. FIGS. 13 and 14 show an exemplary method and structure for reinforcing an IC sidewall so that the IC may be used in a tank configuration such as that shown in FIGS. 2 to 4 for processing or storing water or other liquids. The wall is reinforced by welding a reinforcing structure to the outside of the IC sidewalls (i.e. the inside walls of the tank). The reinforcing structure includes a sheet steel panel 38 having a thickness of the order of one eighth of an inch and channel form stiffeners 40 made of cold-formed steel plate of the order of three sixteenths of an inch in material thickness. Each channel member 40 has walls 42, 44 bridged by flange 46. Channel members 40 are welded to each panel 32 with a wall 42 of each channel member flat against the one side of a panel 32. The width of flange 46 is such that the walls 44 and the panels 34 of the corrugated IC sidewall are essentially coplanar and so form a platform to which the sheet steel panel 38 is fixed. The panel 38 is welded to the walls 44 of the channel members 40 after the channel members have been welded to the panels 32 and is also welded to the exterior surfaces of the panels 34. Walls 42 of the channel members 40 extend further from the respective flanges 46 than walls 44. The disparity in length as between the two channel member walls 42, 44 facilitates bending in the course of a cold forming process for manufacturing the channel members 40. Having the long wall 42 positioned against the panel 32 strengthens the panel 32 and also makes it easier to weld because the presence of the smaller wall 44 does not materially inhibit access when the wall 44 is being welded to the panel 32.

Each channel form stiffener 40 is welded in a position laterally at the center of the associated panel 32 by means of a fillet weld at its top (and optionally at its bottom), and a series of button (or plug) welds through spaced 5/16" diameter circular apertures in walls 42 of the channel members. The panel 38 is welded to the channel members 40, by a series of button welds made at quarter inch diameter circular apertures in the panel 38, the button welds spaced from the floor by distances of 12, 30, 54, 78 and 102 inches, the smaller spacing at the bottom being to combat higher stresses at the bottom of the IC when the tank is full. Button welds are an advantageous structural element of the IC sidewall reinforcing because they provide a controllable technique offering good penetration to the corrugated IC wall while providing a reduced risk of burn damage compared with other welding techniques. The preferred welding process is MIG welding in spray mode with a 0.035 inch metal core wire, a Praxair® MIG Mix Gold™ Gas (argon/$CO_2$ mix), a 350 wire feed speed, and 24V setting. These conditions consistently provide a full penetration weld without burning through the outside wall. Clearly, different welding techniques and materials can be utilized to achieve wall reinforcement using the panels 38 and channel members 40 as described. It is desirable however, to use a process and materials to obtain a strong welding pattern quickly and without burning through the wall of the IC.

For supply convenience, the sheet steel panel 38 is formed from two smaller panels each of the order of 4-5 feet in width laid on edge so that together they span the eight feet plus interior height of the IC. Spacing between edges of adjacent areas of steel panel, whether horizontal or vertical, is made as small as possible and less than 2 inches. This is important because when the IC wall is used for water containment, an insulating polystyrene layer 48 is typically fixed by adhesive to the face of the panels 38 and then the watertight liner 26 is arranged over and secured by adhesive foam caulking to the insulating layer 48. The pressure of water when the tank is full may be so high that if the gap between adjacent sections of steel panel 38 is too large, the pressure of the contained water will deform and press the liner 26 and insulating layer 48 into the gap and possibly damage one or both of the liner and insulation. If no insulation layer is required, it is still important that the panels are fitted closely together to minimize the chance of liner damage. In this case, the liner is attached directly to the steel wall with seams being taped to protect the liner from any sharp edges, the panel to panel space is preferably less than a quarter inch.

Associated procedures may need to be implemented as part of the reinforcing method. For example, if the IC sidewalls of the unreinforced IC are painted, then before any welding of reinforcing structures is performed, the sidewall of the IC that is to form the tank sidewall is sandblasted to render steel bare in order to prepare it for welding. After welding is completed, the IC sidewalls that are to form the tank walls are epoxy painted to prepare them to receive the flexible liner and optionally, the insulation layer.

The reinforced sidewall structure described above has both sidewalls 13 of a particular IC reinforced to the same degree and using the same reinforcing technique. One advantage of such a configuration is that either sidewall of the IC can be used as a wall of the tank. The IC is typically characterized by one end having doors 14 so that service and operating personnel can enter and equipment can be brought into and out of the IC. By having both sidewalls reinforced to an extent enabling either of them to function as the tank sidewall, the IC can be orientated to a position in which the IC end having the doors is in a desired position for convenient work flow and access.

In an alternative embodiment, for the purposes of the block tank IC array of FIGS. 2-4, the IC sidewalls that are to face into the tank interior may be strengthened to a greater degree than the outer sidewalls. In another alternative, the outer IC sidewalls may be strengthened by a different technique than that used for strengthening the sidewalls that face into the tank. Other wall strengthening arrangements are possible including variations described in the above-mentioned co-pending U.S. patent application Ser. No. 14/176,122.

Figure 15:
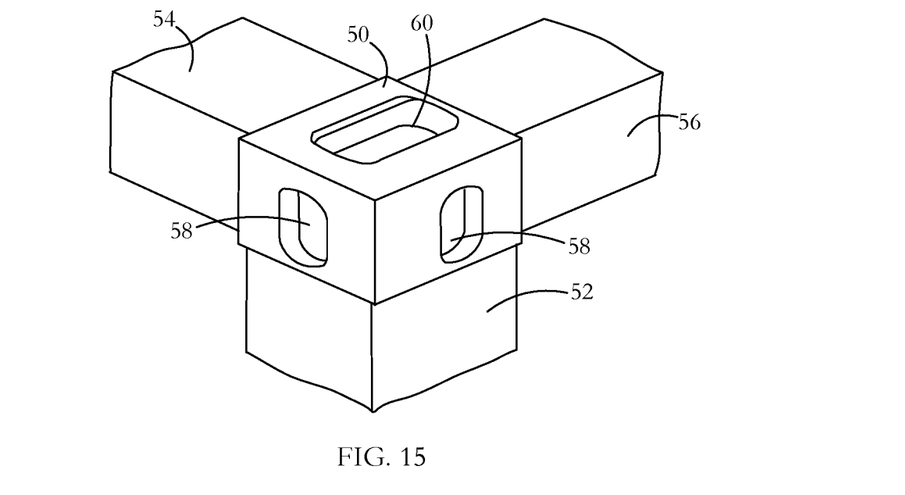
FIG. 15 is an isometric view showing a corner box of an IC.
Figure 16:
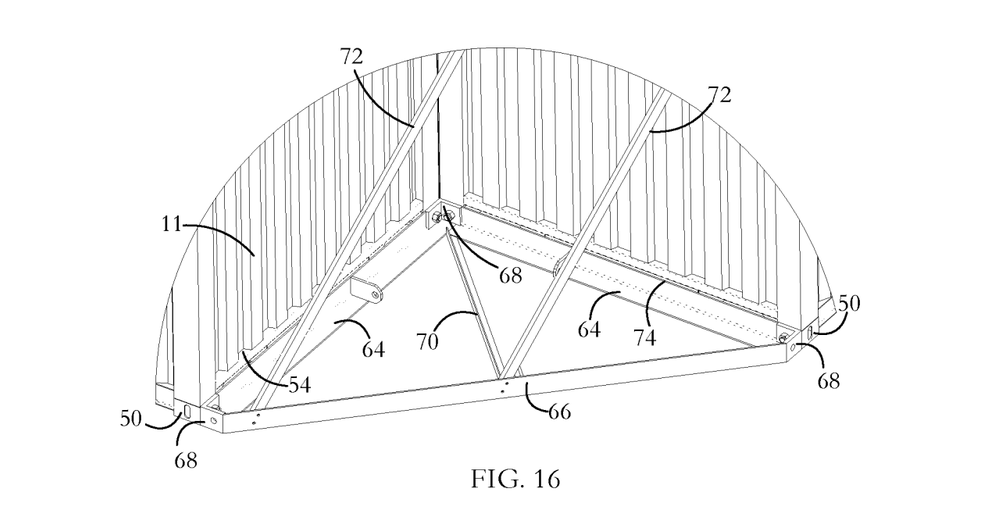
FIG. 16 is a detail perspective view of the bracing structure of FIG. 5 as connected to the ends of a pair of ICs.

An exemplary arrangement for horizontally connecting the ends of adjacent ISO-compliant ICs is shown in FIGS. 5, 6, 15 and 16. The illustrated bracing structure 24 is configured to fit at adjacent end corners of two ICs 11 as shown in FIGS. 6 and 16. The bracing structure 24 is fixed to one of the corner boxes 50 which are present at each of the eight corners of an ISO compliant IC, a typical corner box 50 being shown in FIG. 15. In a conventional IC design, the corner boxes 50 are welded to IC strength members 52, 54, 56 extending between adjacent corners of the IC along its height, width and length respectively. Because the corner boxes 50 are the carrying fixtures for moving ICs between different transport equipment, such as ships and trucks, they are made of substantially heavier duty steel than that used for the corrugated face material or even the strength members 52-56 of the IC. As shown in FIG. 15, each connector box 50 has an aperture 58 in each side and each end and has an aperture 60 in each of its top and bottom. The end and side apertures 58 are usually used for interconnections devices when a number of the ICs are being transported on a container ship or are otherwise temporarily connected together. The apertures 60 are used for lifting the IC and for vertically anchoring stacked ICs together.

The bracing structure 24, as shown in FIG. 5, has top and bottom triangular sections 62. Each section 62 has a contained right angle and is made of side beams 64 and a bracing beam 66, each of the three beams 64, 66 made of angle steel and welded together at their ends using angle pieces 68. An angle steel strut 70 extends between the right angle of each section 62 and the center of the bracing beam. A pair of beams 72 extending diagonally between the triangular sections 62 are bolted to the top and bottom bracing beams 66. The diagonals 72 set a vertical spacing between the sections 62 and add rigidity to the bracing structure.

When two ICs are positioned laterally with their corners in the relative positions shown in FIGS. 6 and 16, and with the right angle of the bracing structure fitted into the right angle between the two IC ends, the top section 62 is level with the top end strength members 54 of the respective ICs, and the bottom section 62 is level with the bottom end strength members 54 of the ICs. At each level, angle pieces 64 have apertures that align with holes 58 of the corner boxes of IC ends to be joined. To fix the structure, high tensile steel bolts and backing plates are used to bolt the bracing structure 24 to each of the corner boxes 50. The bracing structure 24 is similarly attached at both the top and bottom levels. In addition to the bolted angle pieces 68, the beams 64 are welded to the top and bottom end strength members 54 of the two ICs 11 as shown at 74. The materials used and the strength and orientation of the various elements of the bracing structure 24 are selected so as to combat the high pressure experienced at the corner junctions when the liner 26 is in place and the tank is filled with water. The strength of the corner bracing arrangement is made sufficient to prevent any tendency for wall sections near the IC corner connection to bow under the pressure of water contained in the tank.

A simpler and cheaper fixture arrangement for connecting two ICs at their respective corners is alternatively achieved using conventional horizontal connectors that operate by pinning together the IC corner boxes. Such connectors are well known, for example, from U.S. Pat. No. 5,454,673 (DiMartino) which is hereby incorporated by reference in its entirety. The connector has oppositely disposed locking arms, each of which is adapted to engage the inside surfaces of a respective IC corner box. To install the connector, a push block forming part of the connector is screwed relative to a connector base in a first direction so that a part of the push block rotates the particular locking arm causing it to engage the inside surface of the corner box. A reactive force from the surface engagement then causes the push block to move in a second direction angularly disposed to the first direction to cause push block surfaces to be frictionally engaged to lock the arm to the corner box. An arrangement using conventional horizontal connectors may have a particular application where the level of water maintained in the tank is relatively shallow or where the tank is used only for non-permanent or non-cycling purposes While FIGS. 2-4 show the four ICs arranged as walls of a square tank, other tank configurations are possible. In each of such configurations, a plurality of reinforced sidewall ICs are laterally arranged so that corners of adjacent IC ends are adjacent one another and so can be connected as previously described. While the preferred tank shape is square or otherwise rectilinear, adjacent ICs can be positioned so that the included angle between the ICs is less than, or greater than, a right angle. In such tank arrangements, a modified bracing structure using the principles of the bracing structure of FIGS. 5 and 6 may be used. Alternatively, a modified structure to join the ends of adjacent ICs can be used, the modifications being targeted to resist tank damage owing to regions that may experience particularly high pressure or stress when the liner is full of water.

Figure 17:
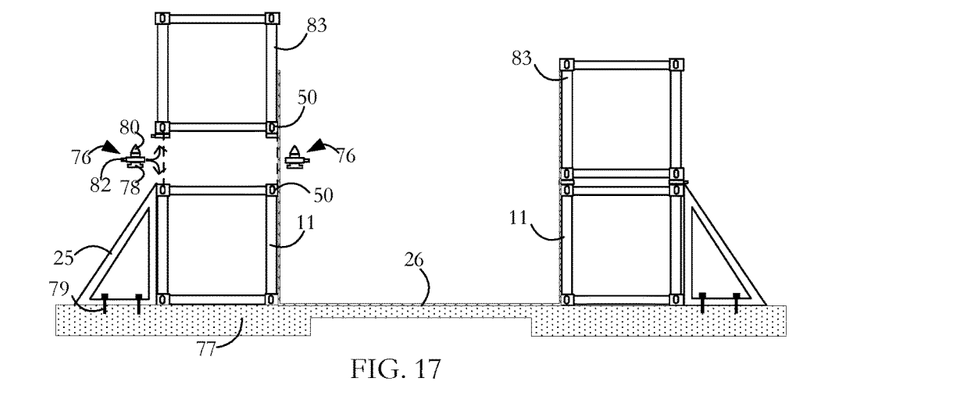
FIG. 17 is a side sectional view showing an IC stacking arrangement for a deep tank structure according to an embodiment of the invention.
Figure 18:
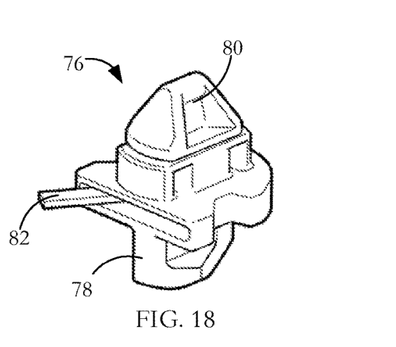
FIG. 18 is a perspective view of a vertical connector forming part of the IC stacking arrangement of FIG. 17.

In one embodiment of the invention, a tank deeper than the 9 feet depth of a standard IC is built from reinforced ICs. In one configuration as shown in FIG. 17, a second layer of horizontally connected ICs 83 is stacked atop a ground-supported first layer of horizontally interconnected connected ICs 11. The ICs 83 of the top layer match in length and width the respective underlying IC 11 so that, in effect, the tank structure has straight walls of the order of 16 feet in height, this being twice the height of an ISO compliant IC. The vertically stacked ICs 11, 83 also need to be fixed together to prevent any relative movement between the ICs of the top layer relative to the respective ICs of the underlying area. To effect this, vertical stacking connectors 76 are attached to each of the four connector boxes 50 of the lower IC 11 and to the corresponding four connector boxes 50 of the upper IC 83. A standard vertical stacking connector can be used. Such connectors, generally complying with international standard ISO 1161, are well known in the art. To use the example illustrated in FIG. 18, an anchor part 78 of the connector 76 is fed though the elongate oval hole 60 in the top of the connector box 50 (FIG. 15) of the lower IC 11. The connector 76 is then turned through 90 degrees about its vertical axis so that a long aspect of the anchor part 78 extends orthogonally to the long aspect of the oval hole 60, thereby maintaining the anchor part 78 in the connector box 50. This is done for each of the four connector boxes 50 of the lower IC 11. A second IC 83 is then manoeuvred into position over the lower IC 11 so that upper twist lock parts 80 of the connectors protrude into the bottom holes 60 of the upper IC connector boxes 50. Using the actuating handle 82, the twist lock part 80 of the connector 76 is rotated through 90 degrees about its vertical axis so that a long aspect of the twist lock part 80 extends orthogonally to the long aspect of the upper connector box hole 60. Turning the actuating handle 82 also fixes the connector 76 in position relative to the upper and lower connector boxes 50 and so fixes the stacked ICs 11, 83 together. It will be appreciated that when an 18 feet deep tank is filled with water, the pressure of water near the bottom of the tank will be considerably higher than the pressure near the bottom of a single IC layer tank. Consequently, the inwardly facing sidewalls 13 of the ICs are strengthened sufficiently to combat the higher pressure. In addition, vertical bracing 25 is used in conjunction with the horizontal bracing of FIGS. 5 and 6. A concrete base 77 is used under the stacked ICs, the lower ICs being pinned into the concrete by anchors 79.

Figure 17A:
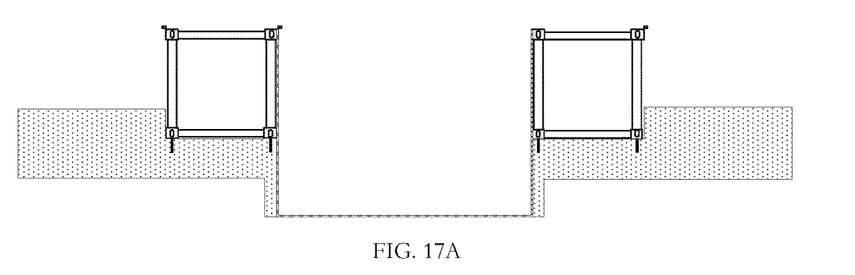
FIG. 17A is a side sectional view showing another deep tank structure according to an embodiment of the invention.
Figure 17B:
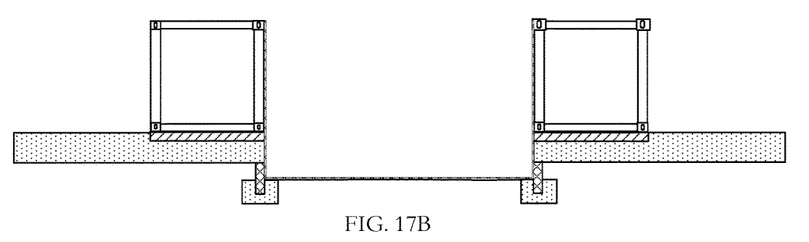
FIG. 17B is a side sectional view showing a further deep tank structure according to an embodiment of the invention.

As shown in FIGS. 17A and 17B, alternative deeper tank structures involve excavation of the tank area surrounded by the IC array. In the embodiment of FIG. 17A, a concrete foundation underlies the ICs. The concrete foundation has an outer section set close against the outer side wall of each IC, a central section underlying the IC and an inner wall section bounding the excavated region. In the FIG. 17A embodiment, attaching pins are fed through the corner boxes of the ICs and set into the concrete foundation. In the embodiment of FIG. 17B, a steel base underlies each of the ICs and is set into the concrete foundation.

Figure 19:
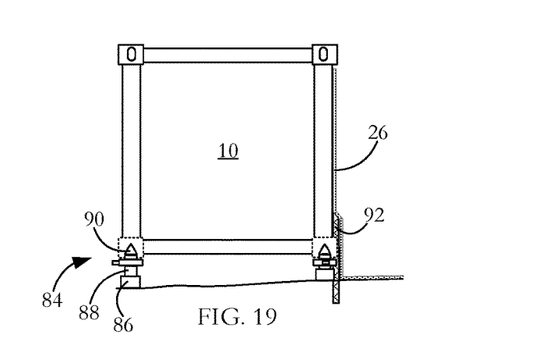
FIG. 19 is an end view showing an IC levelling arrangement for a tank structure according to an embodiment of the invention.

As shown in FIG. 19, leveling connectors 84 are used to support and level the several ICs making up the tank walls if a concrete slab or other flat base is not available and if the ground to be occupied by the tank is not completely level. A leveling connector 84 has a lower base part 86, an intermediate screw form telescopic leveling part 88, and an upper twist lock locking part 90. In use, each leveling connector 84 is positioned so that its base part 86 bears against the ground and its associated twist lock part 90 protrudes up through the lower oval hole 60 of a respective one of the lower corner boxes 50 of an IC. The leveling parts 88 of the several leveling connectors 84 are then manipulated so that, both for a particular IC and for the ICs making up the walled tank structure, the floors of the ICs are level. Any gap beneath an IC or part of an IC that is raised from the ground is blocked with an apron plate 92 maintained flat against the lower sidewall of the IC and driven into the ground.

As indicated previously, the IC walled tank may be used for a variety of water treatment purposes. Processing may take any of a number of forms depending on the nature of the untreated water input and the desired nature of the treated water output. Such processing predominantly occurs inside the tank but requires inputs to, and outputs from, the tank interior.

In one embodiment of the invention, as illustrated in FIGS. 9 to 12, interface components for the tank inputs and outputs are mounted and sealed at ports 94 in a process wall 28. The inputs and outputs include, but are not limited to, any of air lines, power cable, communications cable, piping, viewing access, sampling access, vent access, solid effluent extractor, and manual access. Mounted in the ports may, for example, be any of visual monitors, electronic sensors, and drives from motors or other power sources. Other ports may give access for manual entry or cleaning. For servicing processing equipment below the design level of water to be processed in the tank, the ports 94 are located at a lower level in the process wall 28. For routing communication and power cables, the ports are located at an upper level in the process wall 28 above the water design level.

As shown in FIG. 2, the process wall 28 is mounted in the sidewall opening 30 of one of the reinforced ICs 11. A corresponding process wall may be sited where treated water exits the tank at the sidewall of the same or a different IC in the array. Alternatively a single process wall may be used for both water entry and exit. Communication/power cabling and piping are generally run along the lengths of the ICs except when needed to service equipment mounted in the interior of the tank, in which case they are led through the top of a process wall and through the tank at a level above the water design level. Normally however, most of the communication/power cabling and piping is run into one end of an IC and out of its other end and then, as needed, is routed from that IC to the next IC around the IC array.

The process wall 28 of FIGS. 9 to 12 is designed to be installed at an IC sidewall 13 that has been reinforced, for example, as illustrated with respect to FIGS. 13 and 14. The process wall itself is also reinforced with welded vertical and horizontal angle beams 99. The wall 28 has a central hatch opening 98 in which is hinge mounted an outwardly swinging door 100. The process wall 28 is fixed in position before the tank liner 26 is installed in the tank.

Figure 7:
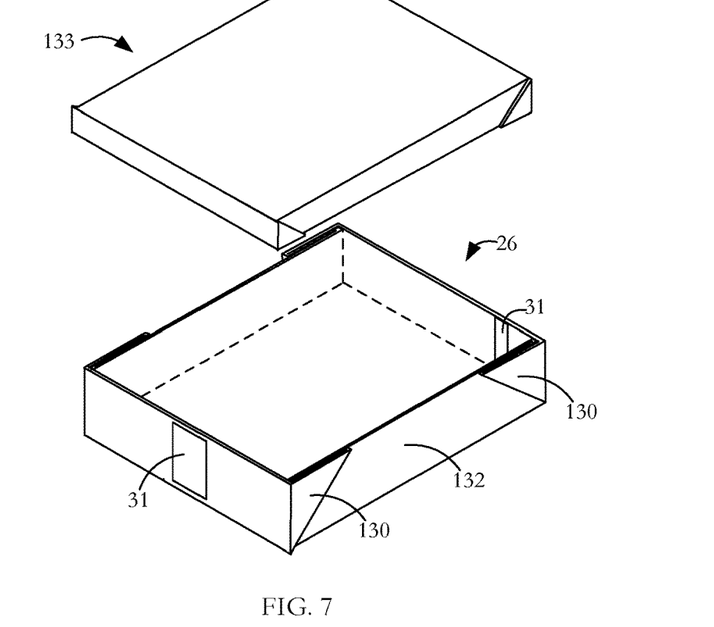
FIG. 7 is an isometric view of a flexible liner and cap forming parts of a tank structure according to an embodiment of the invention, the liner and cap shown as an exploded view and in erected form, the cap and liner shown separate from other elements of the tank structure.
Figure 11:
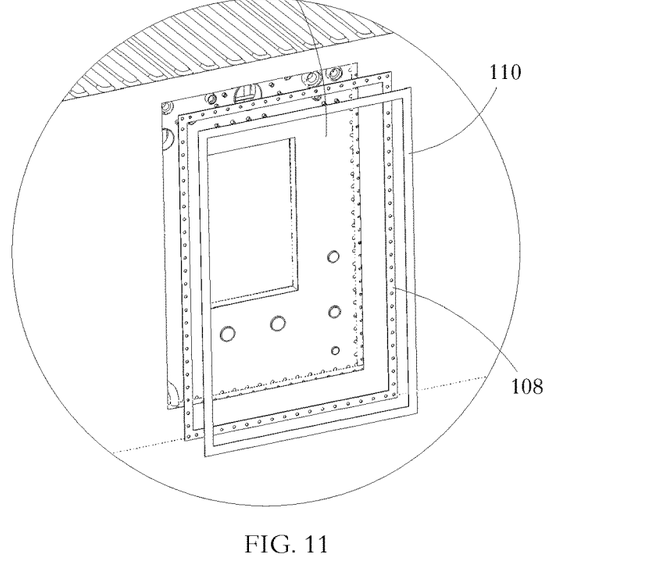
FIG. 11 is a detail exploded view showing a process wall and its relationship with an IC sidewall in a tank structure according to an embodiment of the invention.
Figure 12:
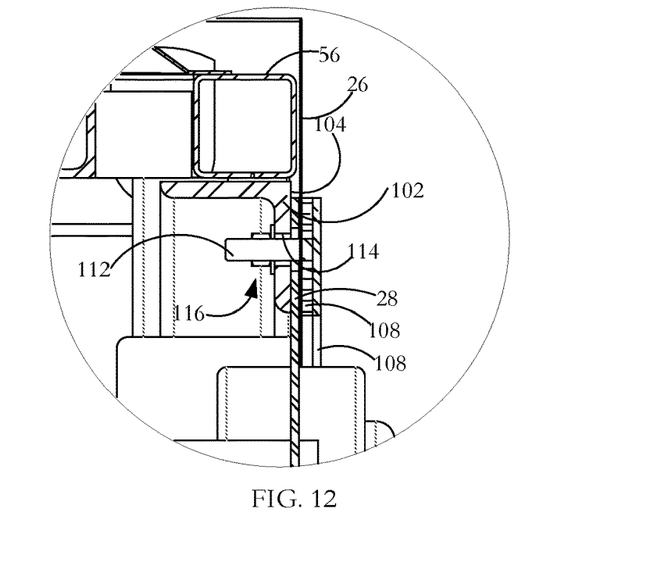
FIG. 12 is a detail sectional view showing a process wall and its relationship with an IC sidewall in a tank structure according to an embodiment of the invention.

To install the process wall, as shown in FIGS. 11 and 12, a mounting frame 102 is first welded to the reinforced IC sidewall where it laterally bounds the opening 30. The frame 102 is also welded at top and bottom to respective IC strength members 56 so that a mounting face 104 of the frame 102 faces into the interior of the tank space (to the right as shown in FIG. 12). From the inside of the tank space, the process wall 28 is welded to the mounting face 104. The liner 26 is moved into the tank interior and, as illustrated in FIG. 7, is manipulated into the box form configuration required in order for it to function as a water-containing tank and is stuck with adhesive to the IC sidewalls. At the process wall, a gasket 108 and sealing frame 110 are placed over the top of the liner 26 at a position aligned with the main frame 102. The sealing frame 110 has welded to it a series of generally equispaced threaded studs 112 which are configured to face away from the interior of the tank. The studs 112 are received in a corresponding series of commensurately placed bolt holes 114 which pass in turn through each of the liner 26, the gasket 108, the process wall 28 and the frame 102. Nut and washer combinations 116 are then screwed onto the studs 112 from the outside of the tank (inside of the IC). The liner 26 is then trimmed back to leave an opening generally aligned with process wall 28. The process wall 28 may be made from quarter inch thick carbon steel, from eighth inch thick stainless steel, or from reinforced fiberglass or plastic sheet. The wall has angle bar strengthening 99 to combat pressure of water in the filled container tank. The process wall 28 is removed as a single structure to enable access to the interior of the tank, when emptied, for repair and servicing if such repair and servicing cannot satisfactorily be achieved using the access door 100.

It is important that the flexible liner 26 is effectively sealed, both over the full extent of the tank and where the liner tub part terminates at the or each process wall 28 or hatch 120. Optionally, an outside liner (not shown) of polyvinyl chloride sheet is positioned outside the main liner 26, the optional liner providing secondary leakage protection for the tank in the event the polypropylene liner 26 fails as a result, for example, of it being accidentally punctured. Openings similar to opening 30 may be made in other of the tank sidewalls for installation in a similar manner of other process walls.

Certain processing equipment may, as operated, be immersed in the tank water and, for such processing equipment, associated process components such as sensors and inspection ports 94 are mounted in the process wall 28 at a process level so that they will interface with the water in the tank. For other services, such as communication and power, if they need to pass into the tank but do not need a direct interface with the contained water, ports 94 are located near the top of the process wall 28.

Processing of water in the tank may be any of a number of forms depending on the nature of the untreated water input and the desired nature of the treated water output. Processing equipment actually installed in the tank interior may include, but is not limited to, any of bubbling equipment, scrubbing equipment, clarifying equipment, stripping equipment and mixing equipment, although it will be understood that a walled tank according to one embodiment of the invention can be used simply for water storage in which case there would be no interior processing equipment. The equipment may include, but is not limited to, any of units and/or structures such as submersible pumps, stripping packing media, tubular media for clarification, air bubblers, venture mixers, diffuser piping, distributors and platforms for supporting packing. Obviously, processing equipment is only installed within the tank to the extent that it needs to be. All other equipment used in treating the water and other support activity for the plant facility is mounted in one or other of the ICs.

Figure 8:
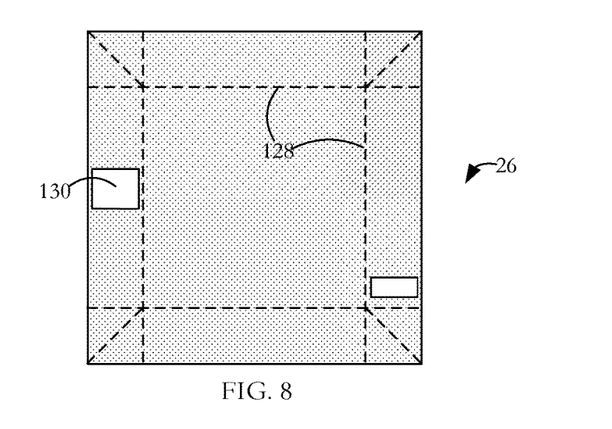
FIG. 8 is a plan view of the liner of FIG. 7 before the liner is manipulated to the shape shown in FIG. 7.
Figure 9:
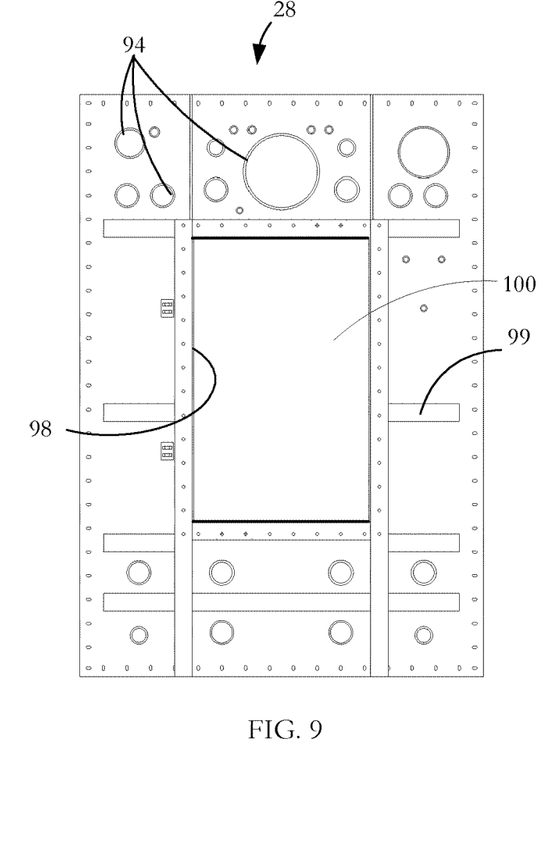
FIG. 9 is a front view of a process wall forming part of a tank structure according to one embodiment of the invention.
Figure 10:
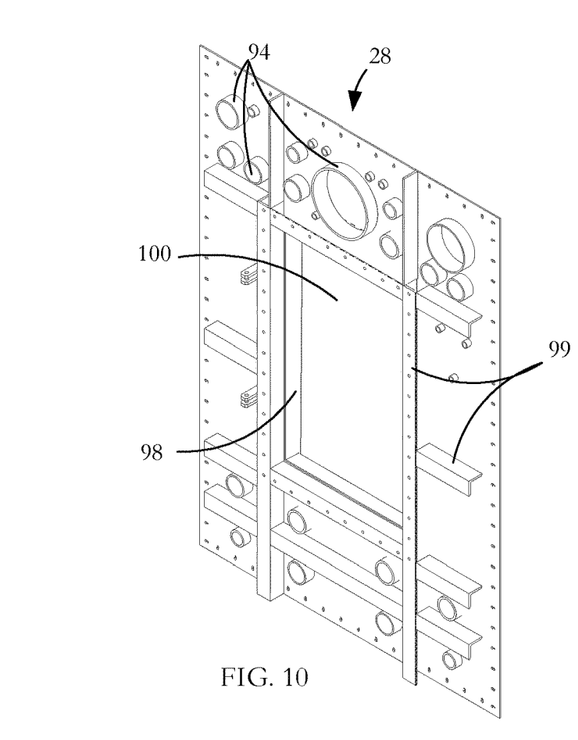
FIG. 10 is an isometric view of the process wall of FIG. 9.

As previously indicated, once the reinforced ICs are arrayed and connected in the block tank formation and the sidewalls 13 have been prepared by protective painting and, optionally a polystyrene insulation has been attached to the sidewalls 13, the floor of the tank interior and the ICs sidewalls 13 forming the inside walls of the tank are covered by the waterproof liner 26. An exemplary form of liner is made of reinforced polypropylene and is shown in FIGS. 7 and 8. The liner is 45 mil thick and typically weighs about 900 lb. This reinforced polypropylene material offers good breaking and tearing strength, and also has good water vapor permeance, hydrostatic resistance, puncture resistance, ozone resistance, linear shrinkage, resistance to water absorption, and breaking and tearing strengths.

As shown in FIG. 8, the liner 26 is formed from a rectangle of stock material. For ICs that are 40 feet in length, the rectangle is of the order of 56 feet square. This may require factory installed seams between narrower lengths of stock material. The rectangle of stock material is cut to form openings 31 for the process walls 28 and to provide other ports as required. The liner material is folded from a base section at lines 128 where the material has previously been tooled to facilitate and localize folding. Excess material at each corner is formed as an envelope fold 130 which, to enable installation in the tank, is folded back along the outer sides 132 of the box form and sealed against them. The liner 26 is thus preformed ready to be deployed as a tailored box form illustrated in FIG. 7.

While FIGS. 7 and 8 illustrate a preferred tank liner arrangement, alternatives are possible. For example, the reinforced ICs can be used as a primary support with a secondary support element such as a concrete tank liner being poured and set against the IC sidewalls forming the interior walls of the tank. In another alternative, the liner is made from plastic sheets that are welded together. In a further alternative, the liner is made of fiberglass sheets that are laid up inside the tank and fixed and sealed together after the ICs have been positioned and interconnected to form the block tank foundation. In yet another alternative, once a block tank foundation is in place, plasticized material is sprayed onto the tank interior walls until a plastic sealing layer is of a thickness necessary that the tank can function to hold water to be treated.

Depending on the purpose of the tank, its top is left open or is closed with a roof. In one roof implementation, a space is left above the top of the tank and is kept ventilated. In a further roof implementation, the roof and the top of the ICs are sealed from the interior of the tank using a liner cap 133 (FIG. 7) which is mounted against the tank roof with the edge of the cap being sealed to the upper edge of the liner 26.

In the example of FIG. 20, a top roof truss 134 spans the full width of an installation embodying the IC array and is joined to side trusses 136 at each end. The trusses are dimensioned such that they are supported as shown on telescopic posts 138 which are placed on, and supported by, the compressively strong corner posts 52 that characterize a conventional IC structure. The position, orientation and dimensions of strut elements (not shown) in the trusses 134, 136 are selected so that individual elements of the trusses are either in tension or compression along their length as is known in the art. The trusses may be planar trusses (as shown) or space trusses adapted for corner regions of the installation as known in the art. This roof arrangement, where there is a relatively large space between the roof underside and the design level of water in the tank, allows for ventilation of the air space using a ventilation subsystem 126. This, in turn, allows humidity reduction with a reduced tendency for elements of the structure to rot, rust or corrode. Tie bars 140 may be attached or welded at intermediate positions along the length of each IC. In the example illustrated, top and bottom tie bars 140 link facing strength members 56 of the illustrated ICs. A part of the liner 26 rests on the bottom tie bar which is shaped and finished so as to prevent damage to the liner 26. The liner contacts the ground or concrete pad either side of the bottom tie bars.

In an alternative embodiment of the invention as illustrated in FIG. 21, a sandwich form flat roof has upper and lower plates 148, 150 connected by an open web joist structure 152. The IC reinforced sidewalls bear the weight of the roof structure, with the roof being tied to the sidewalls by joist support brackets 154. The joist structure is covered on top and sides by an insulated metal paneling 156. Extensions 158 of the liner 26 are brought over the top of the ICs 11 and are used to direct rainwater to the outside of the ICs.

In a further embodiment of the invention, as illustrated in FIG. 22, the roof is composed of an array of arcuate tubular steel hoops 142 which span the IC array tank, the ends 145 of the hoops being bolted to side strength members 56. Bridging lengths 144 are bolted or welded to the hoops to fix them in position relative to one another and a heavy duty flexible cover 146 is draped over and fixed to the hoops 142 and bridging lengths 144.

The illustrated IC tank arrangement is an efficient structure because the ICs, together with the tank area surrounded by the ICs, provide a cost effective installation in the sense that components for the installation can be fabricated at a site away from the system deployment site using economies of scale provided by the IC fabrication industry. The IC block tank arrangement can also be erected quickly at the deployment site because there is little site work required other than preparing the site, positioning and connecting the ICs together and perhaps adding a roof and/or cladding. Overall, remote site installation of a system in this way using ICs previously modified at a home site offers relatively low installation cost, fast time from system commissioning to delivery, and less deployment site installation time.

Figure 23:
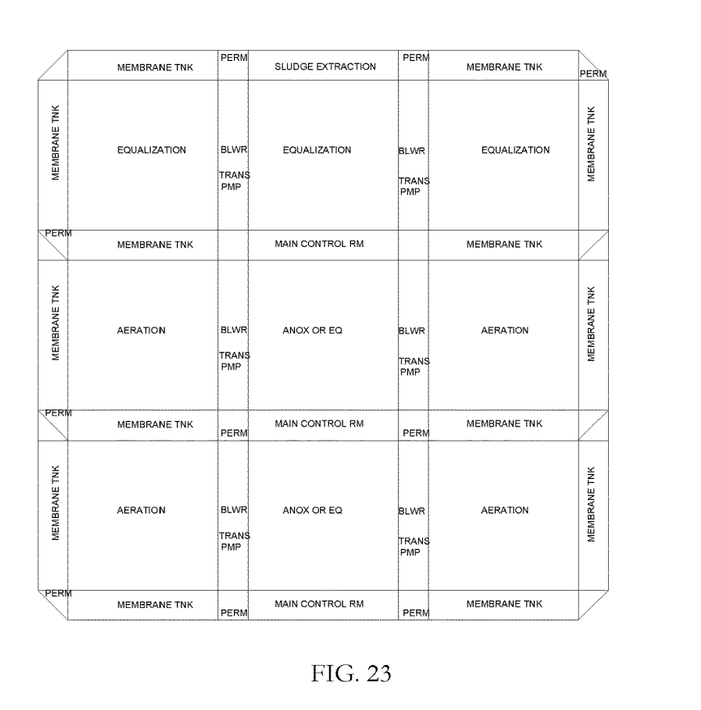
FIG. 23 is a plan view of a square array of tanks according to an embodiment of the invention.
Figure 24:
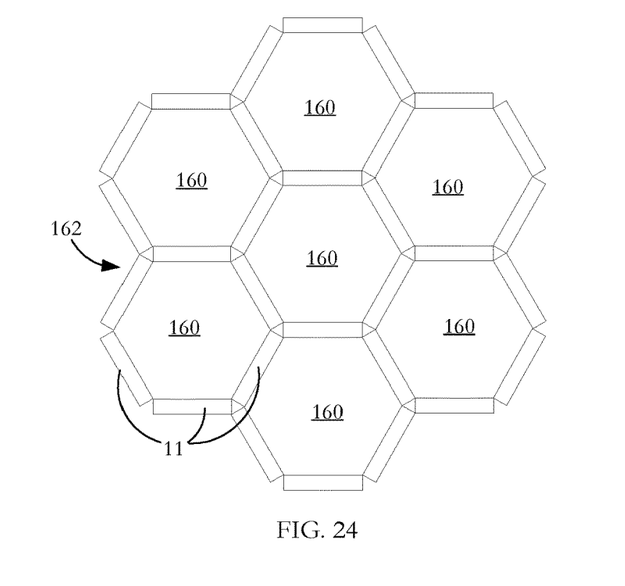
FIG. 24 is a plan view of a honeycomb array of tanks according to an embodiment of the invention.

As indicated previously, the tank structure principle embodied in the tank of FIGS. 2-4 lends itself to tanks of non-square rectilinear plan and to tanks of non-rectilinear polygonal plan. The example of FIG. 23 is a regular super-square of nine square tanks. The figure shows an exemplary layout of interrelated functions to be performed at the tanks and the associated ICs, these including anonic biological reactions (ANOX), equalization (EQ), aeration, sludge extraction, permeate extraction pumping (PERM), aeration and scouring using blowers (BLWR), transfer pumping (TRANS PMP) and membrane processes (MEMBRANE TNK). The membrane tanks are converted ICs whereby the particular IC functions both as a tank and as a wall of a larger square tank embodying the invention. In the example, illustrated in FIG. 24, six modified ICs 11 form a regular hexagonal tank 160. Constructed as a single layer of 40 feet long ICs, the tank contains of the order of 279,000 gallons. The hexagon tank arrangement is duplicated so as to form a classic honeycomb structure 162. The illustrated example has seven hexagon tanks 160 capable of containing, in aggregate, about 2,000,000 gallons. In this embodiment, at least some of the ICs forming walls of one tank are shared with adjacent tanks. It is noted that a problem of building large bolt-together tanks is that the hoop stress increases with diameter. With the illustrated honeycomb design, a tank effectively 290 feet wide is achieved having hoop stresses that do not exceed those of an 85 feet diameter tank.

Other variations and modifications will be apparent to those skilled in the art. The embodiments of the invention described and illustrated are not intended to be limiting. The principles of the invention contemplate many alternatives having advantages and properties evident in the exemplary embodiments.

The invention claimed is:

1. A water treatment tank having an interior volume defined by a surrounding wall having a first plurality of contiguous straight wall sections, each straight wall section being a reinforced sidewall of a respective intermodal container (IC), contiguously adjacent ones of the ICs being interconnected, at least some of the contiguously adjacent interconnected ICs being interconnected at an included angle less than 180 degrees whereby collectively to define a tank area for said interior volume, a bracing structure attached to end walls of the ICs at each junction between adjoining ICs that are interconnected at said included angle, the tank having a liner supported at said reinforced side walls and covering the ground at the tank area.

2. A water treatment tank as claimed in claim 1, further comprising a roof supported on the ICs and bridging the tank area.

3. A water treatment tank as claimed in claim 1, further comprising at least one tie bar extending between at least one pair of ICs to oppose pressure of water, when contained in the tank, tending to force facing the ICs apart.

4. A water treatment tank as claimed in claim 3, the at least one tie bar being below the liner.

5. A water treatment tank as claimed in claim 3, the at least one tie bar being above the liner.

6. A water treatment tank as claimed in claim 1, at least one of the sidewalls having a port therein, the liner having an opening therein coincident with the port.

7. A water treatment tank as claimed in claim 6, the port occupied by a process wall, the at least one sidewall having an integral first flange, the process wall having an opposing flange, a part of the liner at said opening sealingly clamped between the opposed flanges.

8. A water treatment tank as claimed in claim 7, the IC associated with said at least one sidewall containing processing equipment for use in treating water when contained in the tank.

9. A water treatment tank as claimed in claim 8, the processing equipment having an operating interface through the process wall to the interior of the tank.

10. A water treatment tank as claimed in claim 1, the tank being equipped to function as one of a holding tank, an aeration tank, an equalization tank a membrane bioreactor tank, a settling tank, a filtration tank and an air/water tank.

11. A water treatment tank as claimed in claim 2, further comprising a liner cap below the roof and sealingly attached to the liner.

12. A water treatment tank as claimed in claim 2, further comprising a ventilation subsystem installed at the top of the tank, the ventilation subsystem operable to circulate air in a space underneath the roof and above water when the water fills the tank.

13. A water treatment tank as claimed in claim 1, further comprising a second plurality of ICs stacked vertically atop the first plurality of ICs, the liner additionally supported at the sidewalls of the second plurality of ICs.

14. A tank arrangement comprising a plurality of tanks as claimed in claim 1, at least one of the tanks being adjacent to and fixed to another of the tanks.

15. A tank arrangement as claimed in claim 14, wherein, opposed to the reinforced sidewall of one of the ICs, said one IC has a second reinforced sidewall providing a straight wall section of a second tank.

16. A water treatment tank deployment method comprising reinforcing sidewalls of a plurality of intermodal containers (ICs), selecting an area of ground, siting the plurality of ICs to form a tank interior volume defined by a surrounding wall, the surrounding wall having a first plurality of contiguous straight wall sections, each straight wall section being a reinforced sidewall of a respective one of the ICs, interconnecting contiguously adjacent ones of the ICs so that at least some of the contiguously adjacent interconnected ICs are interconnected at an included angle less than 180 degrees whereby collectively to define a tank area for said interior volume, installing a strengthening bracing structure to IC end walls at each junction between adjoining ICs interconnected at said included angle, and installing a liner so that the liner is supported at the reinforced sidewalls and covers the ground at the tank area.

17. A tank deployment method as claimed in claim 16, further comprising installing water processing equipment in at least one of the ICs for processing water in the tank.

18. A tank deployment method as claimed in claim 17, further comprising flowing water into the tank and treating the water with the processing equipment.

* * * * *